Patented Dec. 26, 1944

2,365,828

UNITED STATES PATENT OFFICE 2,365,828

CONCENTRATION OF ACID SOLUTIONS

John P. Loud, Cumberland, Md., assignor to Celanese Corporation of America, a corporation of Delaware No Drawing. Application November 24, 1942, Serial No. 466,793

1 Claim. (Cl. 260—541)

This invention relates to improvements in the manufacturing of concentrated lower aliphatic acids from dilute solutions thereof, and relates more particularly to the manufacture of concentrated acetic acid from dilute acetic acid obtained from any source but especially from dilute aqueous acetic acid obtained as a by-product in the acetylation of cellulose.

It is an important object of this invention to provide a novel process for solvent-extracting acetic acid or other lower aliphatic acids from dilute solutions thereof, which process will be especially efficient in operation, particularly with respect to the acid solution obtained for subsequent fractionation.

Another object of this invention is the provision of a novel process for solvent-extracting acetic acid from dilute aqueous solutions thereof produced in the acetylation of cellulose whereby there is obtained an acetic acid solution containing very little dissolved water which may be azeotropically removed therefrom in an economic manner.

Other objects of this invention will appear from the following detailed description.

It is well known that a concentrated acetic acid, and other lower aliphatic acids, may be produced from dilute aqueous acid by extraction with solvent liquids such as ethyl ether, ethyl acetate, butyl acetate, chloroform, benzene, cresols or other phenols or tar oils of high boiling point, etc., or mixtures thereof. The ideal liquid extracting medium or extractant is, of course, one in which the acid being extracted from the aqueous solution is highly soluble and in which the water is substantially insoluble. While some of the liquid solvents normally employed have low mutual solubility with water, they are not very effective agents for stripping the acid from the aqueous solution thereof. Accordingly, by the use of such solvents a relatively large proportion of the acid present in the aqueous solution remains therein, necessitating extracting the aqueous solution a number of times in order to remove the acid. On the other hand, some of the liquids are excellent solvents for the acid and are quite effective in removing the same from its aqueous solution, but these solvents suffer from the disadvantage of having high mutual solubilities with water. These solvent liquids tend to dissolve substantial amounts of water with the acid, making the concentration of acetic acid by a subsequent fractional distillation operation a costly process due to the large amount of water which must be separated from the extracted acid.

I have now discovered a more efficient process for extracting lower aliphatic acids, and particularly acetic acid, from dilute aqueous solutions thereof, wherein the amount of acetic acid removed from the aqueous solution by the extracting medium is increased and the amount of water removed with the acid-extractant solution is decreased. In accordance with the process of my invention, these highly desirable results are attained by heating a suitable extracting medium, which is preferably a mixture of ethyl acetate and benzene, and then feeding the preheated extracting medium to the bottom of the column apparatus where it comes into contact with the aqueous acid solution which is fed into the column at the top thereof at or below room temperature. Since the extracting medium is specifically lighter than the aqueous acid solution, it will flow counter-currently to the acid solution. In my process, therefore, the extracting medium is at a relatively high temperature when it comes in contact with the relatively dilute aqueous acid solution about to leave the extraction column and is at a relatively low temperature near the top of the column where it is in contact with the acid-rich aqueous solution which has just entered the extracting column.

By maintaining the extracting medium at a relatively high temperature on entering the extraction column, the extraction of the acid remaining in the relatively dilute solution near the bottom of the extraction column takes place with great efficiency. This is due to the fact that the two-phase multi-component system comprising the extracting medium and the aqueous acid solution reaches equilibrium more quickly at elevated temperatures and the major portion of the acid remaining in the dilute solution is therefore extracted in much shorter time. Since the extracting medium is at a relatively low temperature near the top of the extraction column, after moving counter-currently to the flow of the acid solution, the solubility of the water therein is at a low point and the ratio of acid to water dissolved by the extracting medium is at a maximum. The solvent extract which spills over the top of the extraction column accordingly may be azeotroped economically to remove the dissolved water.

As stated, the preferred extracting medium is a mixture of ethyl acetate and benzene. The ratio of these two solvents in the solvent mixture may be adjusted over a wide range to deal efficiently with various strengths of dilute aqueous acid to be concentrated. The lower the dilution of the aqueous acid, the greater must be the proportion of the ethyl acetate used. Advantageously, the extracting medium may contain from 60 to 90% by volume of ethyl acetate and from 40 to 10% by volume of benzene. Where the dilute acid to be concentrated is dilute aqueous acetic acid of 30 to 33% concentration obtained from the acetylation of cellulose, the preferred ratio of solvents in the solvent mixture is 70% by volume of ethyl acetate and 30% by volume of benzene.

In practice the dilute aqueous acetic acid recovered from the manufacture of cellulose acetate, normally having an acetic acid concentration of 30 to 33%, is pumped to the top of the extraction column and fed thereto at a temperature at or below room temperature, say, from 10 to 20° C. The extracting medium is heated by any suitable means to a temperature of from 40 to 60° C. and preferably to 45° C., and pumped to the bottom of the extraction column. The heated extracting medium raises the temperature of the aqueous acid solution, thus causing the multi-component system to attain the desired equilibrium conditions in a very short time, the acid leaving the aqueous solution and dissolving in the extracting medium. Since the heat of the extracting medium is not immediately dissipated, the extraction of the acid takes place at a raised temperature for a substantial proportion of the path of the extracting medium through the acid solution in the extracting column, which condition increases the solubility of the acid and favors the solution thereof in the extracting medium. The temperature of the acid-carrying extract is preferably between 15 and 25° C. in order that dissolved water therein be kept to a desired low degree. It is for this reason, as indicated above, that the dilute aqueous acid solution is fed to the extracting column at a low temperature. In this connection, it is advantageous to cool the acid-carrying extract by means of a cooler located outside of the extraction column. This cooler separates from the acid-carrying extract some of the water contained therein, and this water is removed before the acid-carrying extract is passed on to be vaporized. In this way, any desired amount of cooling could be obtained, irrespective of the aqueous acid temperature. This cooling step is of great value during summer temperatures, for example. Moreover, with external cooling the whole of the extraction column could be kept at a high temperature, thus increasing the extraction efficiency. The liquid issuing from the bottom of the column is substantially free of acid but contains a little dissolved solvent. This solvent is stripped from the acid-exhausted liquid which then is run to the sewer.

The acid-carrying extract from the top of the column, which contains some water and a little dissolved cellulosic material, is vaporized from a boiler into the middle of a fractionating still where the solvent and water distil over the top azeotropically and the residual acid is removed from the fractionating still base as concentrated acid. The cellulosic impurity is almost all retained in the boiler. The solvent and water are condensed and separated and the solvent is recycled. Some dissolved solvent in the water is stripped by fractionation and the water discarded.

The extraction apparatus which may be employed carrying out the process of the present invention may be in the form of a column or series of columns to obtain intimate contact between the extracting medium and the dilute acid solution. A turbulence may be created, or the column or columns may be filled in whole or in part with surface materials such as raschig rings, broken stoneware, or other packing material. Highly satisfactory results are obtained when baffle plates are employed to cause an intimate contact between the extracting medium and the dilute aqueous acid as they pass counter-currently to each other.

In order further to illustrate my invention, but without being limited thereto the following example is given:

*Example*

A dilute aqueous solution of acetic acid of 33% strength and at a temperature of 15° C. is run counter-currently, downward through a vertical extracting column provided with baffle plates, to a stream of heated extracting medium flowing upward. The extracting medium comprises 70% by volume of ethyl acetate and 30% by volume of benzene. The extracting medium entering the extraction column is heated to 45° C. The flow of extracting medium and dilute acid is adjusted so that 2 volumes of extracting medium are passed into the base of the column while 1 volume of cool dilute acid to be concentrated is added at the top. The interface between the extractant and the aqueous solution is maintained at the top of the column. The cool extract leaving the top of the column has a composition comprising approximately 15.5% by weight of acetic acid, 7.0% by weight of water and 77.5% by weight of the extractant. The aqueous discharge from the base of the tower contains 0.05% by weight of acetic acid.

Since each part of water in the mixture requires about 11 parts of solvent-extractant to remove it azeotropically in a fractionating column, the process of the present invention is highly economical since only a small amount of water is carried over from the top of the column in the acid extract. Moreover, since equilibrium conditions are reached more rapidly in accordance with my invention, columns of smaller length may be employed. Another advantage of the instant invention is that by employing ethyl acetate and benzene in the proper ratio and adjusting the rate of flow of extractant to that of aqueous acid, it is thus possible to achieve a balance of water, acetic acid, benzene and ethyl acetate in the extract mixture such that in the subsequent distillation of the extract the whole of the water is removed azeotropically with the benzene and ethyl acetate and glacial acetic acid may thus be obtained directly in a single distillation.

While my invention has been more particularly described in connection with the concentration of dilute solutions of acetic acid, other lower aliphatic acids may be concentrated from their dilute aqueous solutions as well. Examples of other lower aliphatic acids which may be concentrated in accordance with the process of my invention are formic acid, propionic acid, butyric acid, isobutyric acid, and other members of the series.

It is to be understood that the foregoing detailed description is given merely by way of illustration and that many variations may be made therein without departing from the spirit of my invention.

Having described my invention, what I desire to secure by Letters Patent is:

In a process for the concentration of an aqueous solution containing about 33% of acetic acid, the step which comprises extracting 1 part by volume of the aqueous solution of acetic acid with 2 parts by volume of an extracting medium comprising 70% by volume of ethyl acetate and 30% by volume of benzene flowing counter-currently to the aqueous solution, said aqueous solution having an initial temperature of about 15° C., the extracting medium having an initial temperature of about 45° C., and the acid-laden extracting medium having a final temperature of about 25° C.

JOHN P. LOUD.